April 11, 1950          J. H. ESAK          2,504,071
MACHINE FOR SCRAPING AND BURNISHING
THE EDGES OF BOOKS
Filed Jan. 30, 1948          5 Sheets—Sheet 1
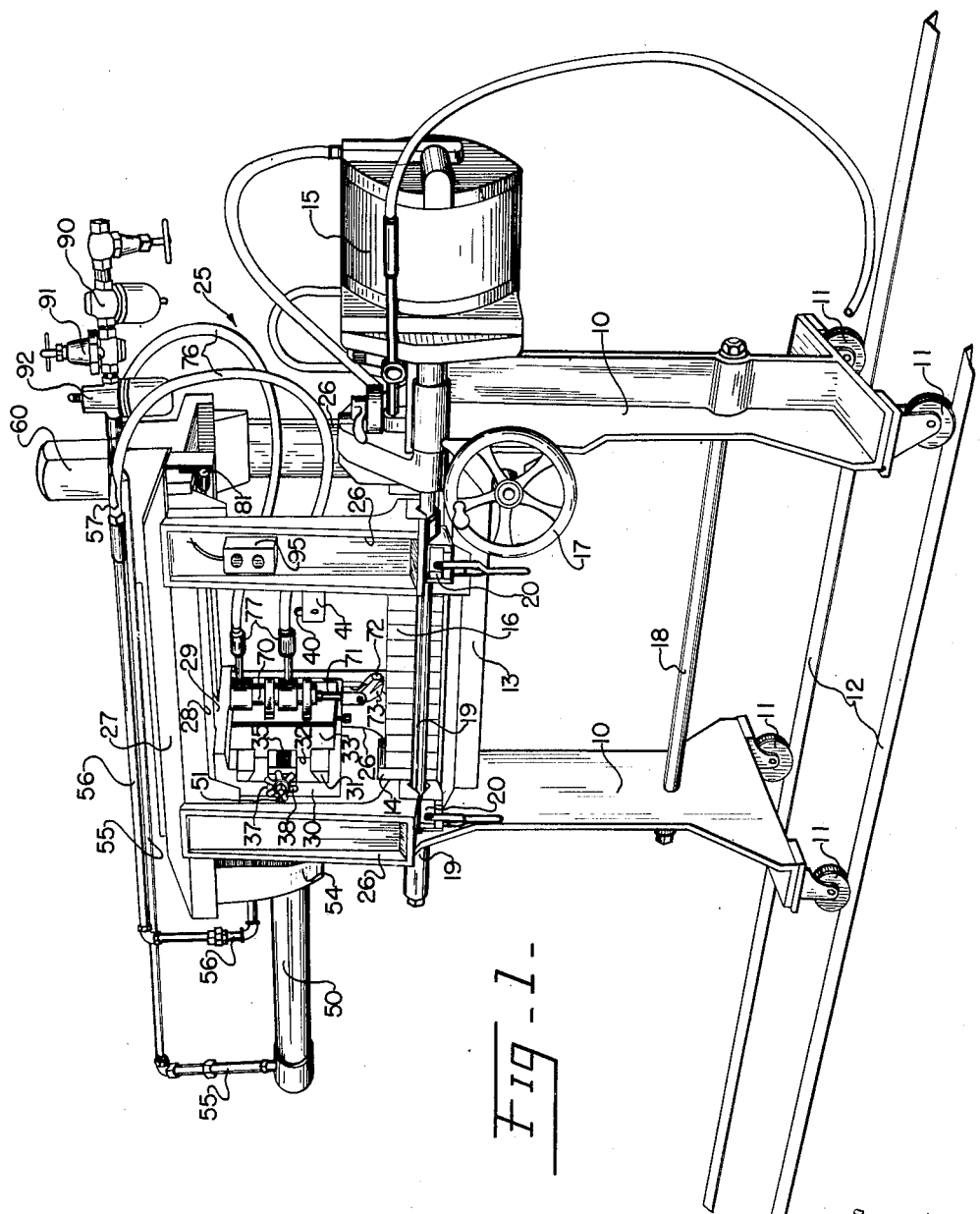
Fig-1-
Inventor.
JOHN H. ESAK.
By *Tarney & O'Connell.*
Attorneys.

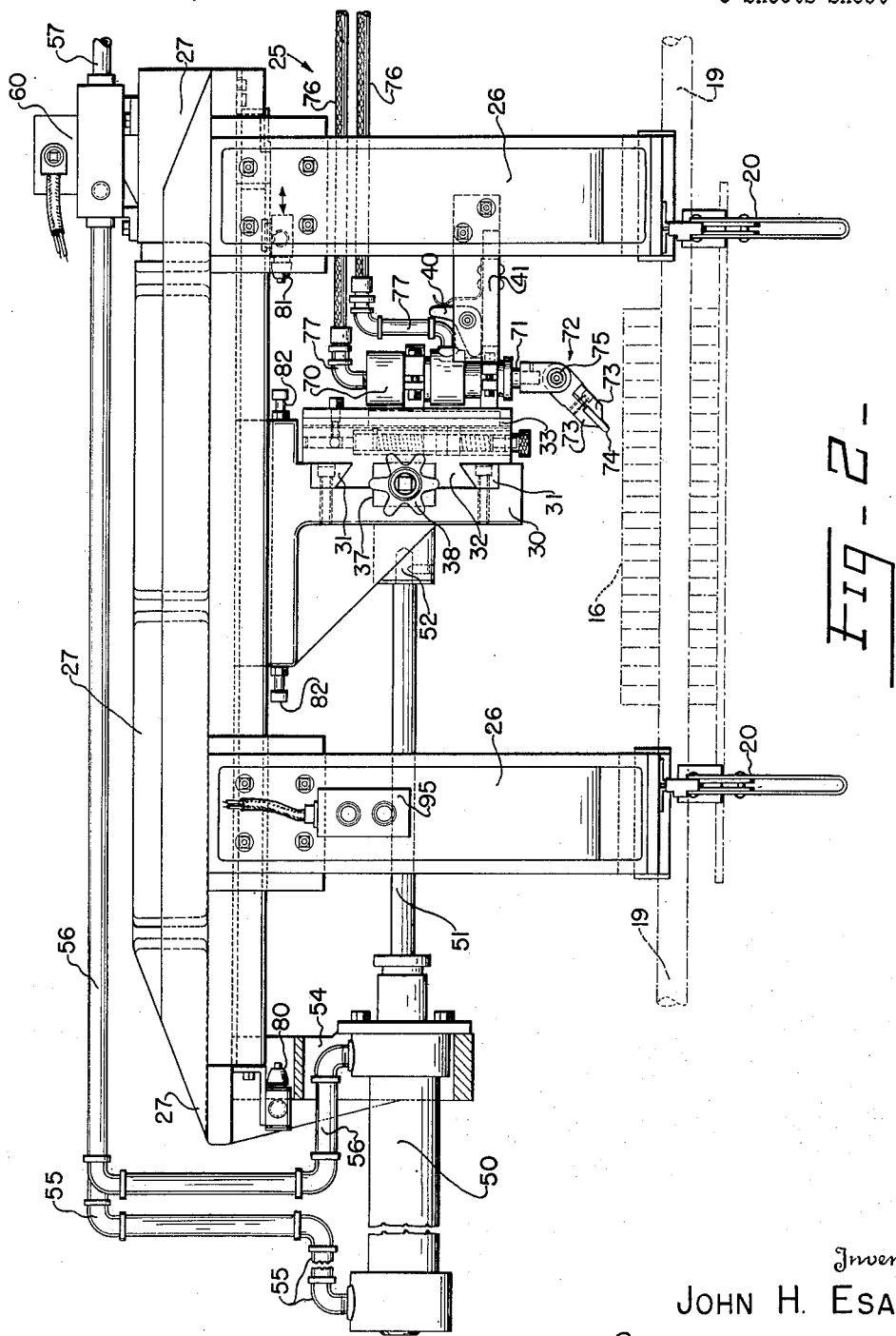

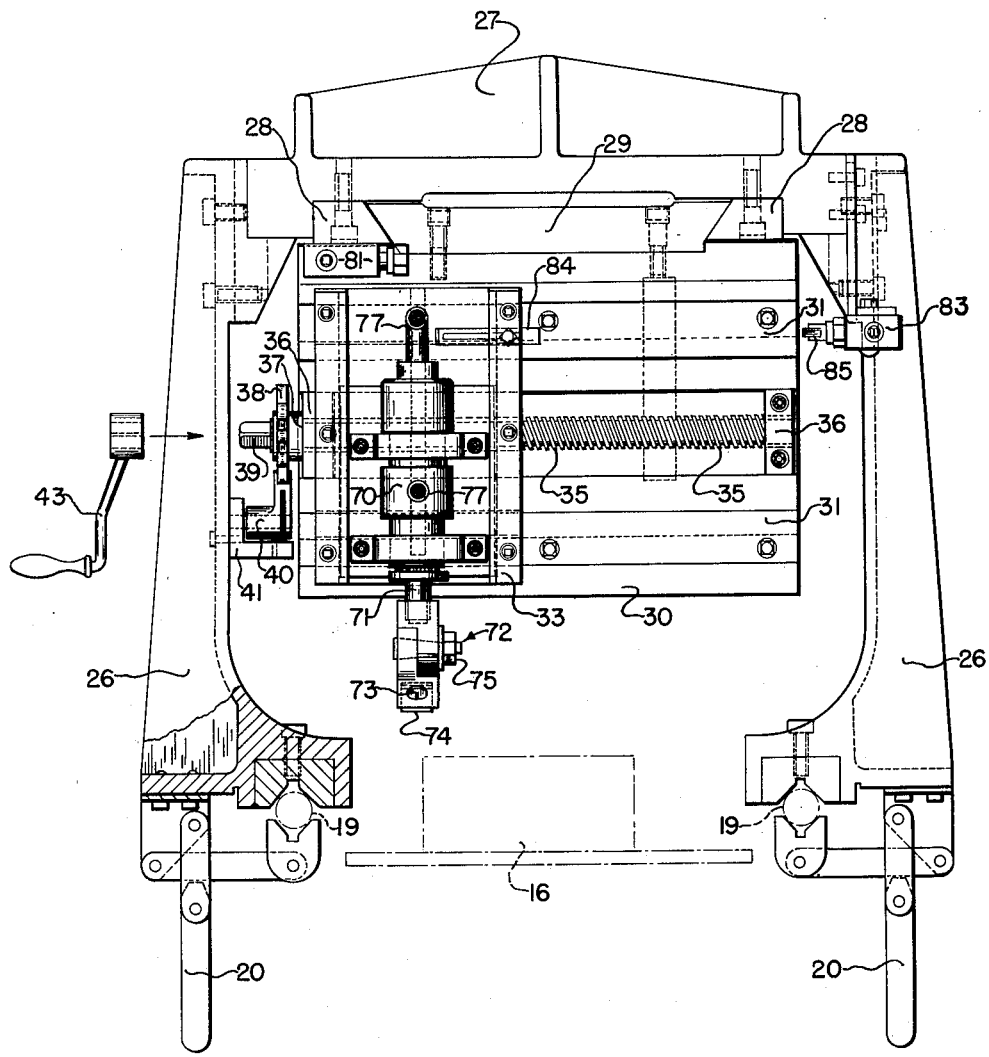
Fig_3_

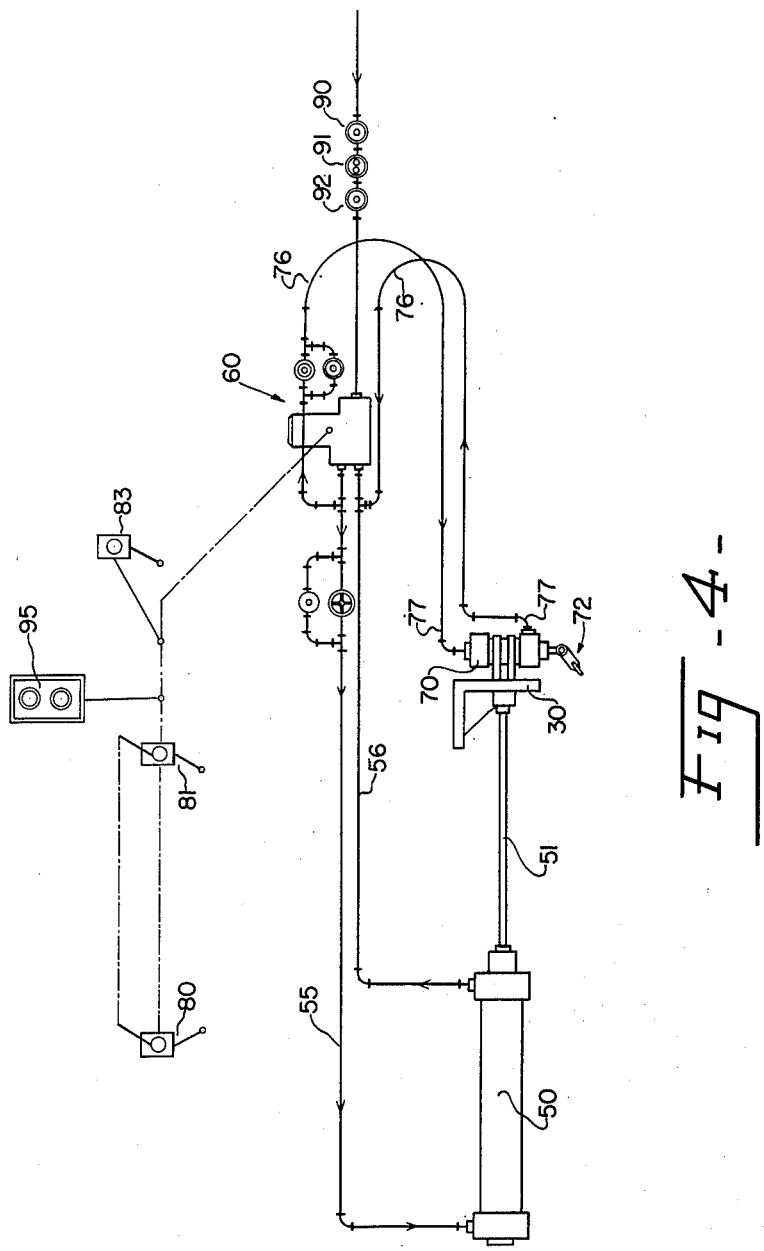

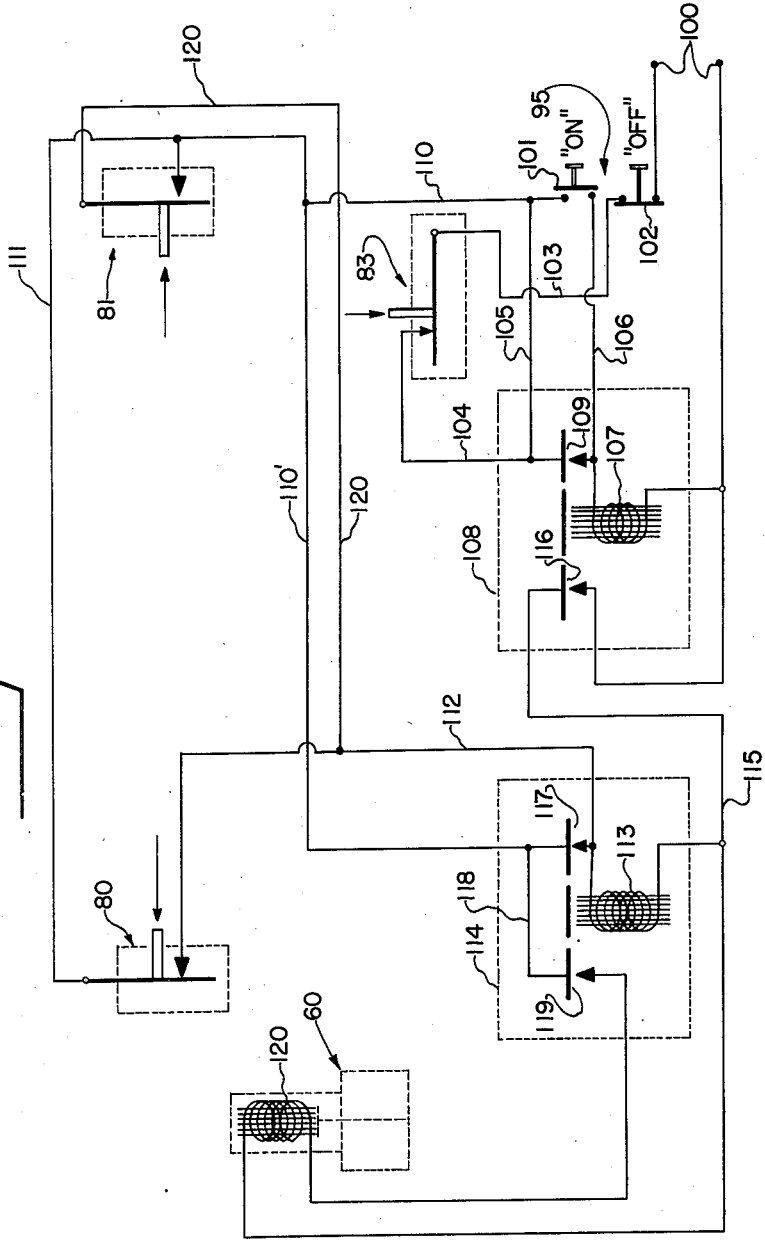

Patented Apr. 11, 1950

2,504,071

UNITED STATES PATENT OFFICE 2,504,071

MACHINE FOR SCRAPING AND BURNISHING THE EDGES OF BOOKS

John H. Esak, Camden, N. J., assignor to Haddon Bindery, Inc., Camden, N. J.

Application January 30, 1948, Serial No. 5,367

5 Claims. (Cl. 90—38)

This invention relates to a machine for treating the edges of books, and more particularly to a machine for scraping and burnishing the edges of books. The word "books" as used herein includes papers, cards and the like.

The subject matter of the present invention is particularly susceptible of use in conjunction with the machine and process described in my co-pending application, Serial No. 726,045, filed February 3, 1947, of which this application is a continuation-in-part.

In the manufacture of fine books it is desirable to treat the edges of the books before they are bound. The treatment may consist of clamping a number of books in a fixture, scraping and/or sanding the edges to produce a smooth finish, applying a dye to the edges, applying gold leaf or spraying gold on the edges, and burnishing the gold on the edges. In the past, the edges of books have been treated more or less by hand. It is therefore an object of this invention to provide a machine capable of facilitating some or all of the aforementioned operations on a mass production basis.

In pursuance of this general object and many other objects which will be apparent to those skilled in the art, I provide a pneumatic clamp within which the books to be treated are secured and may be manipulated for convenience of working on the edges thereof. The pneumatic clamp is provided with wheels which run on a "production line" track from one work station to another. The foregoing has been set out in detail in my co-pending application, Serial No. 726,045.

I also provide a book edge scraping and burnishing machine for use in conjunction with the aforesaid pneumatic clamp. The scraping and burnishing machine is removably secured to the pneumatic clamp and is provided with a scraping or burnishing tool which is made to reciprocate across the edge surface of the clamped books. The scraping and burnishing machine is automatic in that, after being set in operation, it finishes the edge surface of each and every book in the pneumatic clamp.

Referring briefly to the drawings wherein I show the presently preferred embodiment of the invention:

Figure 1 is a perspective view showing a book edge scraping and burnishing machine, constructed in accordance with the teaching of this invention, superimposed upon a pneumatic book clamp of the type described in my co-pending application, Serial No. 726,045;

Figure 2 is a side elevational view of the book edge scraping and burnishing machine, with certain parts shown in section;

Figure 3 is an end elevational view of the same;

Figure 4 is a diagrammatic representation of the pneumatic system of the scraping and burnishing machine, including the electrical control for the pneumatic system; and Figure 5 is a schematic wiring diagram of the electrical control system for the machine.

Referring now in greater detail to the drawings, Figure 1 shows the scraping and burnishing machine superimposed on the pneumatic clamp. As described in my co-pending application, the pneumatic clamp consists of a support 10 provided with wheels 11 which are adapted to ride on track 12. The support 10 has cradled therein a pneumatic book clamp consisting of a longitudinal shelf 13 and jaws 14. One of the jaws 14 is acted on by the piston rod of pneumatic cylinder 15. The books 16 are thereby clamped tightly between the jaws 14. The longitudinal shelf 13 and the jaws 14, with the books clamped therebetween, are rotatably mounted as a unit on the support 10. Rotation is accomplished by operation of crank wheel 17 so that the particular edge surfaces to be worked on may be disposed uppermost. The two legs of the support 10 are secured in spaced relationship by means of tie rods 18 and 19, 19.

The book edge scraping and burnishing machine is superimposed upon the pneumatic clamp and is removably secured by means of fasteners 20 to the tie rods 19, 19 thereof. As shown to advantage in Figures 2 and 3, the scraping and burnishing machine comprises a frame generally designated 25, including legs 26 and top member 27. The top member is provided on its lower side with dovetail guide members 28 within which a dovetail slide member 29 is free to reciprocate. Member 29 is secured by means of bolts to a carriage structure 30. It is thus far apparent that the carriage structure 30 depends from the top member 27 and is free to reciprocate longitudinally therebelow.

The carriage structure 30 is reciprocated longitudinally of the top member 27 by means of an air cylinder 50 having a piston therein connected by means of piston rod 51 to the carriage structure 30 at 52. Air cylinder 50 is rigidly secured to the top member 27 by means of a bracket structure 54. Air is supplied to, and exhausted from, the ends of the air cylinder 50 through pipes 55 and 56. In order to reciprocate the carriage 30, air is supplied from a source through pipe 57 to a solenoid-operated valve 60 which permits the air to alternately enter pipes 55 and 56 as will be more fully explained in connection with Figure 4.

Carriage structure 30 is itself provided with lateral dovetail guide members 31 which are engaged with a mating dovetail slide 32 secured to cross slide 33. Cross slide 33 is thereby arranged so that it can reciprocate at right angles to the reciprocation of the carriage structure 30.

A lead screw 35 is journaled to the carriage structure 30 at 36 and 37, and is in threaded engagement with the cross slide 33. One end of lead screw 35 is provided with a star wheel 38 and has a polygonal extension 39. In operation, when the carriage structure 30 reciprocates, star wheel 38 is engaged by a dog 40 mounted by means of a bracket 41 to a leg 26 of the frame. In passing over the dog 40, star wheel 38 is given a partial revolution which is operative through the lead screw 35 to shift the cross slide 33 by a small amount. This feeding action is accomplished once for every cycle of reciprocation of the carriage structure 30. In order to return the cross slide 33 to its original position, a crank handle 43 is provided for engagement with the polygonal extension 39.

The cross slide 33 has a pneumatic cylinder 70 vertically mounted thereon. The cylinder 70 contains a piston (not shown) connected by means of piston rod 71 to an adjustable tool holder 72. The tool holder 72 has jaws 73, between which the tool 74 is clamped. The angularity of the tool 74 may be adjusted by means of a bolt 75 forming a part of tool holder 72. The type of tool 74 which is used will depend on whether the operation to be performed is a scraping operation or a burnishing operation. It has been found desirable to use a scraping tool in place of the former method of sanding. An agate or carbide tool is employed for a burnishing operation.

Compressed air from a source is supplied through flexible hose 76, pipes 77, to the opposite ends of pneumatic cylinder 70. The air is alternately supplied to the opposite ends of cylinder 70, thereby alternately raising and lowering the tool holder 72. By this means the tool 74 is raised from the edges of the books during the return stroke of the carriage 30 and is urged against the edges of the books during the work stroke of the carriage. The force with which the tool 74 is urged against the books during the work stroke may be accurately pre-set by adjusting the air pressure supplied to the pneumatic cylinder 70. Hose 76 is a flexible hose of sufficient length so that it allows for the free reciprocation of the carriage 30.

Limit switches 80 and 81 are mounted beneath the top member 27 and in line with the actuating bolts 82 on the carriage structure 30. Actuating bolts 82 may be adjusted to protrude from the carriage 30 by the amount desired, in an obvious manner. Limit switches 80 and 81 are adjustably mounted longitudinally of the top member 27 to provide additional leeway in the setting of the limits of reciprocation of the carriage 30. Limit switches 80 and 81 are operative, when actuating, through the solenoid-operated air valve 60 to reverse the direction of motion of the carriage structure 30. A cross slide limit switch 83 is mounted on a leg 26 of the frame and is appropriately disposed so that actuator 84 on the cross slide 33 is operative to engage the switch 83 when the cross slide has been fed to its extreme position. The button 85 of limit switch 83 is provided with a roller for engagement by the actuating pin 84. The pin 84, being mounted on the cross slides 33, reciprocates longitudinally with the carriage 30 and strikes the button 85 of limit switch 83 as it moves therepast. Cross limit switch 83 is operative to stop the reciprocation of the carriage 30 as will be described in connection with an explanation of Figure 5.

Briefly, the operation of the machine as thus far described is as follows: Air cylinder 50, acting through piston rod 51, causes the reciprocation of carriage structure 30, the limits of motion being determined by limit switches 80 and 81. With every complete reciprocation of the carriage 30, the star wheel 38 is engaged by dog 40 and causes the cross slide 33 to be fed by a small amount. The pneumatic cylinder 70 raises the tool 74 during the return stroke and urges the tool against the books with a pre-set force during the work stroke. The cross slide 33, carrying the tool, is gradually fed laterally across the work until the projection 84 on the cross slide actuates the cross slide limit switch 83. When this happens, the machine is automatically turned off. The finished books are then removed from the machine, a new set of books clamped therein, and then hand crank 43 is engaged with the extension 39 of the lead screw 35 and is employed to return the cross slide 33 to its original or starting position. The machine is then ready to be started again, after which it will automatically perform the complete cycle of operation.

Referring now to Figure 4 for a description of the control system, compressed air is supplied from a source through air cleaner 90, pressure regulator 91 and lubricator 92 to solenoid-operated air valve 60. The air valve 60 has a closed position, a position admitting air through pipe 56 to one end of air cylinder 50, and another position admitting air through pipe 55 to the other end of air cylinder 50. Solenoid-operated air valve 60 is controlled, as indicated by dotted lines, by limit switches 80, 81 and 83, and start-stop switch 95. When limit switch 80 is actuated, valve 60 admits air through pipe 55 to cylinder 50. When limit switch 81 is actuated, valve 60 admits air through pipe 56 to the other end of cylinder 50. When cross limit switch 83 is actuated, valve 60 is put in its closed position.

Flexible hose 76 are each connected to one of pipes 55 and 56. Therefore, when air is applied through pipe 55 for the return stroke of the carriage 30, air is also applied to the top end of pneumatic cylinder 70. On the other hand, when air is applied through pipe 56 for the work stroke of the carriage 30, air is also applied through hose 76 to the bottom end of pneumatic cylinder 70. In this way the tool holder 72 is lifted during the return stroke and is urged down against the books during the work stroke. Violent action of the piston in air cylinder 50 is avoided by suppressing the exhaust from the valve 60 to such an extent that only the initial exhaust pressure on the return stroke is allowed to escape. Due to the pressure built up by having a small orifice, the piston is allowed to travel 75% of its return stroke at a high speed and the remaining 25% at a decelerated rate. The carriage 30 is moving at a slow speed when it actuates the limit switches 80 and 81.

Figure 5 shows the electrical control system for the air valve 60. A source of electricity is connected to terminals 100. When the machine is to be set in operation, the "on" button of switch 95 is pressed, allowing current to flow from the source from "off" switch 102, wire 103, armature of limit switch 83, wire 104, wire 105, "on" switch 101, wire 106, solenoid 107 of relay 108, and back to the source. Relay 108 is thus energized and the contacts closed. The relay is held closed by the flow of current from the source through "off" switch 102, wire 103, limit switch 83, wire 104, holding contacts 109, solenoids 107 and back to the source.

When the "on" switch is pressed, current is also allowed to flow from the source 100 through "off" switch 102, wire 103, limit switch 83, wire 104, wire 105, wire 110, wire 111, limit switch 80, wire 112, solenoid 113 of relay 114, wire 115, contacts 116 and then back to the source. Relay 114 is thereby energized and its contacts closed. Relay 114 is held in closed position by the flow of current from wire 110 through wire 110', contacts 117, solenoid 113 and then back to the source. Current is then allowed to flow from wire 112 through contacts 117, jumper 118, contacts 119, valve solenoid 120, wire 115, contacts 116 and back to the source. Therefore, as a result of pressing "on" switch 101, relays 108 and 114 and valve solenoid 120 are energized. Valve 60 then allows air to enter air cylinder 50 and drive the carriage 30 towards limit switch 80.

When the carriage 30 reaches and opens limit switch 80, the circuit from the source through the solenoid 113 of relay 114 is broken and the contacts of the relay spring apart. As a result of the opening of the contacts, energy is no longer supplied to the solenoid 120 of air valve 60, and the air valve 60 allows air to enter the air cylinder 50 to return the carriage 30.

When the carriage 30 returns on the back stroke to the limit switch 81, switch 81 is closed with the result that current is allowed to flow from the source through "off" switch 102, wire 103, limit switch 83, wire 104, wire 105, wire 110, limit switch 81, wire 120, wire 112, solenoid 113 of relay 114, wire 115, contacts 116 and back to the source. Relay 114 is thereby reenergized, causing its contacts to close and allowing energy to be again supplied to the solenoid 120 of the air valve 60. The air valve 60 then supplies air to the other end of air cylinder 50, causing the carriage 30 to resume its work stroke.

This reciprocation of the carriage 30 continues until the cross slide 33 has been fed enough to actuate cross limit switch 83. When cross limit switch 83 is actuated, it opens the circuit from the source through the solenoid 107. As a result, solenoid 107 is deenergized and the contacts of relay 108 spring apart. The opening of contacts 116 interrupts the current supplied to solenoid 113 of relay 114 so that the contacts of relay 114 are opened. As a further result, the energy supplied to the solenoid 120 of air valve 60 is interrupted and the air valve 60 is moved to its "off" position.

In order to restart the machine, the cross slide is cranked back to its starting position and then the "on" switch 101 is momentarily closed. The cycle of operation then automatically repeats itself. If, during operation of the machine, the operator desires to stop it, he merely opens "off" switch 102, thereby deenergizing the relays in the same manner that the actuation of limit switch 83 deenergizes the relays.

While the invention has been described in detail in its present preferred embodiment, it will, of course, be understood that such has been done for purposes of illustration only and not by way of limitation, and therefore only such limitations are to be imposed thereon as may reasonably come within the scope of the appended claims.

I claim:

1. A machine for scraping and burnishing the edges of books in a clamp comprising a frame adapted to be secured to the clamp, a carriage slidably engaged with the frame, pneumatic means on the frame for reciprocating the carriage including limit switches, the limit switches being actuated by the carriage and operative to reverse the direction of the carriage, a cross slide engaged with the carriage, lead screw means on the carriage for shifting the cross slide, and a tool mounted on the cross slide and disposed for working on the edges of the books in the clamp.

2. A machine for scraping and burnishing the edges of books in a clamp comprising a frame adapted to be secured to the clamp, a carriage slidably engaged with the frame, means on the frame for reciprocating the carriage, a cross slide engaged with the carriage, lead screw means on the carriage for shifting the cross slide, a pneumatic cylinder mounted on the cross slide including a piston and piston rod, and a tool holder on the piston rod, the pneumatic cylinder being operative to urge the tool against the edges of the books with a pre-set force during the work stroke of the carriage.

3. A machine for scraping and burnishing the edges of books comprising a pneumatic clamp for a plurality of books and a support therefor, the clamp being rotatably mounted in the support to position any of the three edge surfaces of the books for treatment, a frame adapted to be secured to the support, a carriage slidably engaged with the frame, means on the frame for reciprocating the carriage, a cross slide engaged with the carriage, lead screw means on the carriage for shifting the cross slide, and a tool mounted on the cross slide and disposed for working on the edges of the books in the clamp.

4. A machine for scraping and burnishing the edges of books in a clamp comprising a support and a pneumatic book clamp cradled in the support, means for rotating the clamp about its longitudinal axis, a frame adapted to be secured to the support, a carriage slidably engaged with the frame, means on the frame for reciprocating the carriage, a cross slide engaged with the carriage, lead screw means on the carriage for shifting the cross slide, and a tool mounted on the cross slide and disposed for working on the edges of the books in the clamp.

5. A machine for scraping and burnishing the edges of books comprising a support, a book clamp rotatably mounted on the support to position and support selected edges of books in the clamp for contact with a tool for treating said edges, a carriage mounted above the clamp to reciprocate relative thereto, a cross slide on the carriage to move transversely relative to the carriage, a tool for working on book edges suspended from the cross slide, means connected with the carriage for reciprocating the latter, and means on the carriage and connected with the cross slide for shifting the latter.

JOHN H. ESAK.

REFERENCES CITED

The following references are of record in the file of this patent:

UNITED STATES PATENTS

| Number | Name | Date |
| --- | --- | --- |
| 258,120 | Richards | May 16, 1882 |
| 1,275,404 | Damerell | Aug. 13, 1918 |
| 2,355,811 | Martindell | Aug. 15, 1944 |

FOREIGN PATENTS

| Number | Country | Date |
| --- | --- | --- |
| 20,733 | Great Britain | Oct. 1, 1908 |